(12) United States Patent
Wandschneider

(10) Patent No.: US 10,072,721 B2
(45) Date of Patent: Sep. 11, 2018

(54) DEVICE FOR TRIGGERING A GAS SPRING

(71) Applicant: Guido Wandschneider, Eschelbronn (DE)

(72) Inventor: Guido Wandschneider, Eschelbronn (DE)

(73) Assignee: Guido Wandschneider, Eschelbronn (DE)

( * ) Notice: Subject to any disclaimer, the term of this patent is extended or adjusted under 35 U.S.C. 154(b) by 0 days.

(21) Appl. No.: 14/906,114

(22) PCT Filed: Jul. 11, 2014

(86) PCT No.: PCT/DE2014/000351
§ 371 (c)(1),
(2) Date: Jan. 19, 2016

(87) PCT Pub. No.: WO2015/010673
PCT Pub. Date: Jan. 29, 2015

(65) Prior Publication Data
US 2016/0160953 A1    Jun. 9, 2016

(30) Foreign Application Priority Data

Jul. 23, 2013    (DE) .................... 20 2013 006 581 U

(51) Int. Cl.
*F16F 9/02*    (2006.01)
*F16C 1/10*    (2006.01)
(Continued)

(52) U.S. Cl.
CPC ............ *F16F 9/0263* (2013.01); *B60N 2/929* (2018.02); *F16C 1/10* (2013.01); *B64D 11/064* (2014.12)

(58) Field of Classification Search
CPC ........... B62J 1/06; F16F 9/0263; B62K 19/36; F16C 1/10; B60N 2/443; A47C 3/30
See application file for complete search history.

(56) References Cited

U.S. PATENT DOCUMENTS

| 5,638,722 A | 6/1997 | Klingler |
| 6,220,582 B1 | 4/2001 | Wandschneider |
| 9,403,568 B2 * | 8/2016 | Tseng .................... B62J 1/06 |

FOREIGN PATENT DOCUMENTS

| DE | 4321985 C | 1/1995 |
| DE | 19716720 A | 10/1998 |

(Continued)

OTHER PUBLICATIONS

Written Opinion of the International Searching Authority dated Jul. 21, 2016 for the corresponding PCT Application No. PCT/DE2014/000351.

*Primary Examiner* — Thomas C Diaz
(74) *Attorney, Agent, or Firm* — Leason Ellis LLP

(57) ABSTRACT

A device for triggering a gas spring comprises an actuating device and an actuating element which is operatively connected to the actuating device and acts on an end-side trigger of the gas spring. The actuating element acts on the trigger and is designed as a lever arrangement which reduces or multiplies the force and/or distance and which comprises an actuating lever, which is connected to the actuating device. The device also comprises at least one trigger lever, which interacts with the actuating lever and which acts on the trigger and a housing. A first housing connecting unit is provided on the housing. The connected actuating device is guided substantially parallel to the longitudinal direction of the gas spring. A second housing connecting unit is provided on the housing. The connected actuating device is guided substantially transverse to the longitudinal direction of the gas spring.

21 Claims, 10 Drawing Sheets

(51) Int. Cl.
*B60N 2/90* (2018.01)
*B64D 11/06* (2006.01)

(56) References Cited

FOREIGN PATENT DOCUMENTS

| | | | | |
|---|---|---|---|---|
| DE | 202005014056 U | 1/2007 | | |
| DE | 102013012189 A | 1/2015 | | |
| EP | 0362038 A | 4/1990 | | |
| EP | 0907842 B | 4/1999 | | |
| EP | 1328738 A | 7/2003 | | |
| ES | 2267353 A | 3/2007 | | |
| WO | WO-0233286 A1 * | 4/2002 | ............ | F16F 9/0263 |
| WO | WO 2004023937 A1 * | 3/2004 | ................ | B62J 1/06 |

* cited by examiner

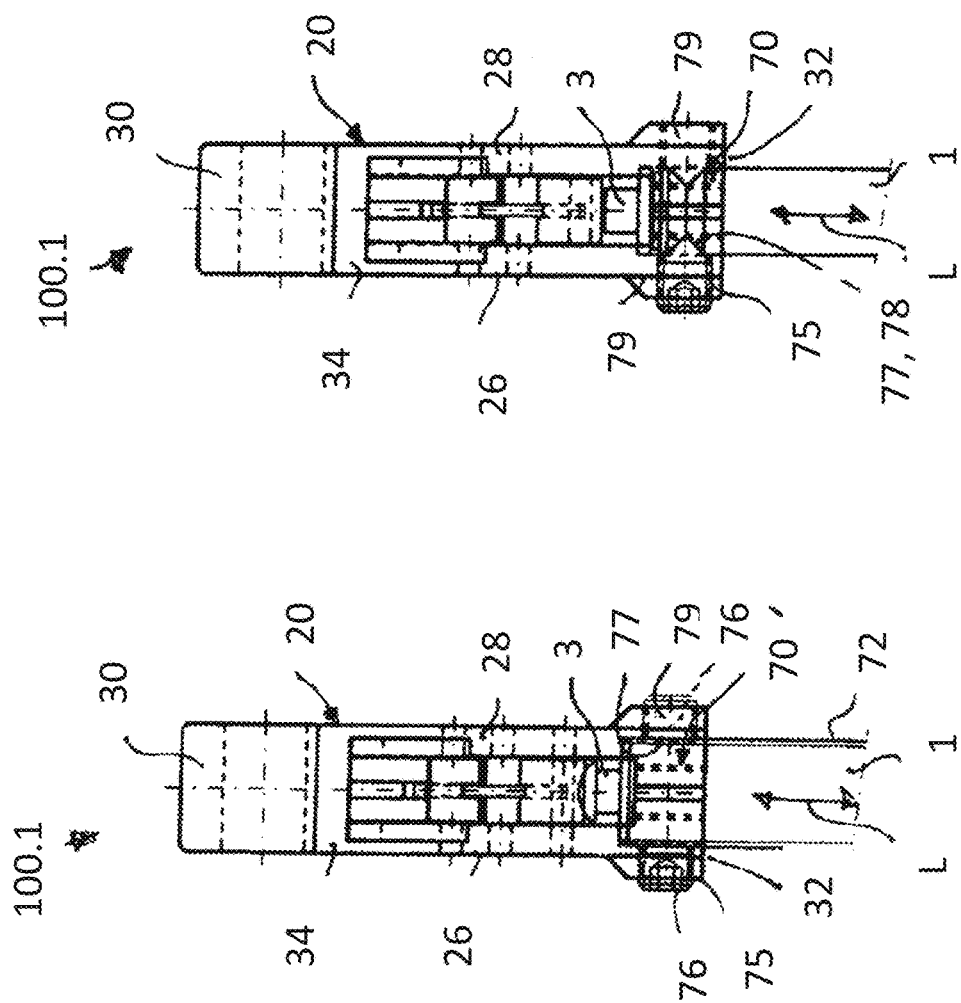

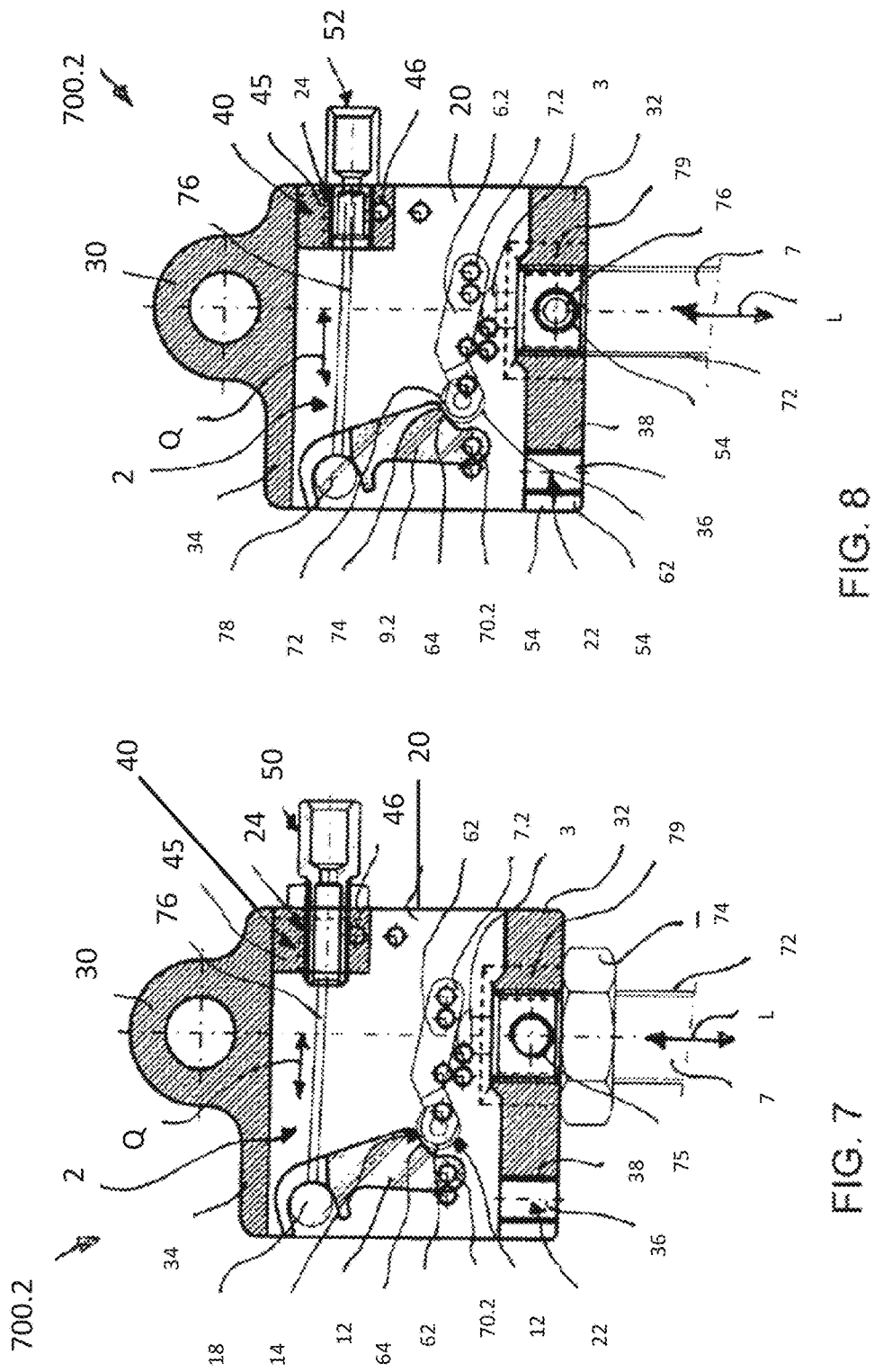

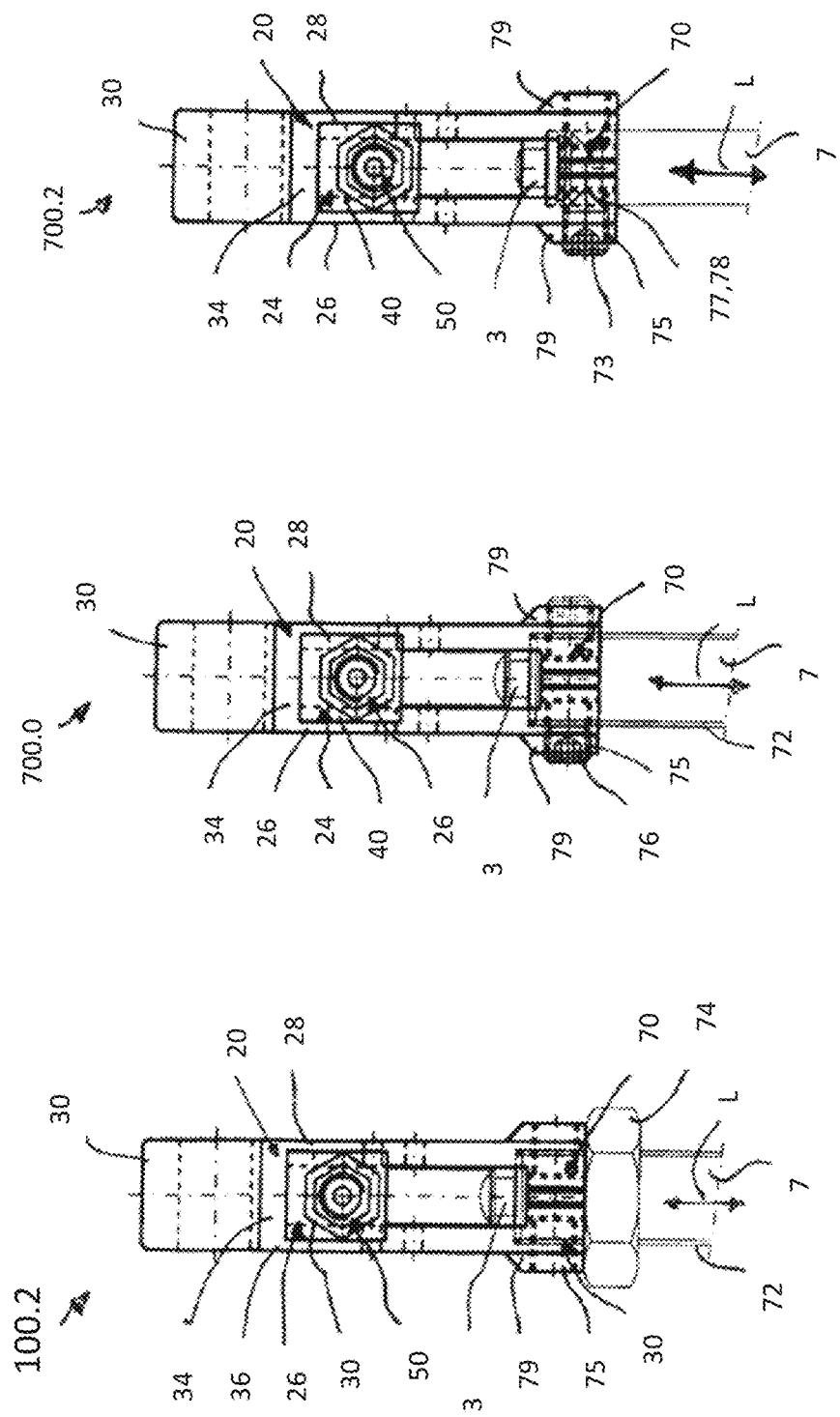

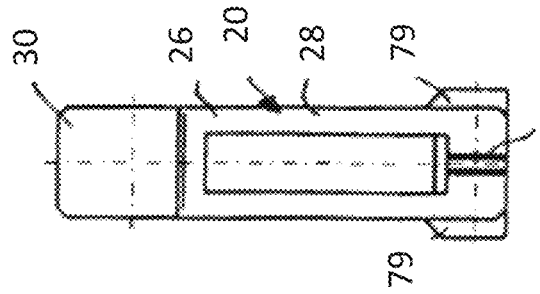
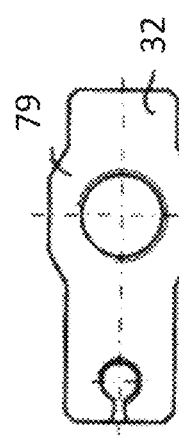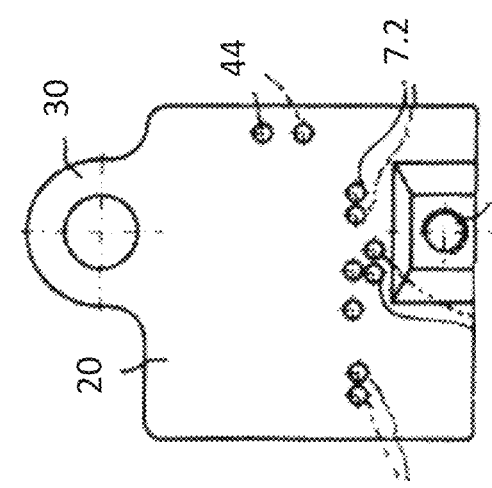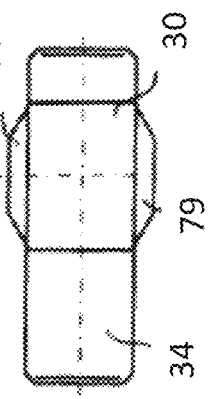
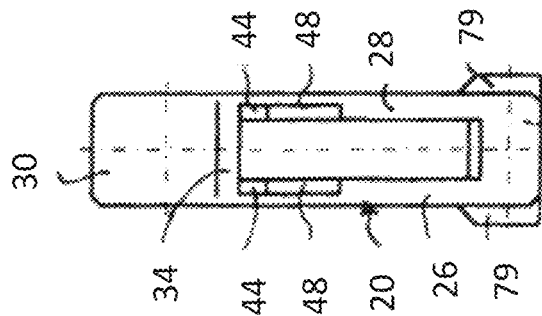

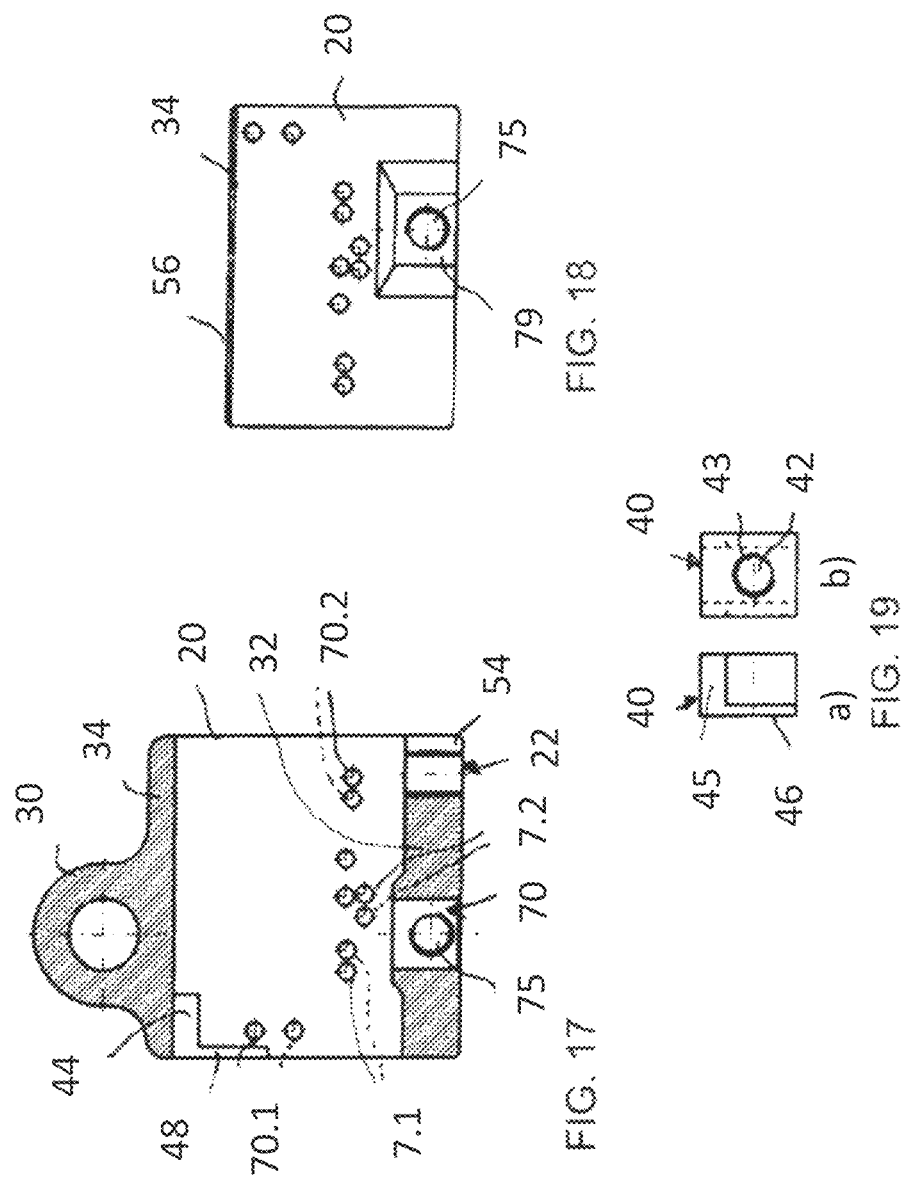

DEVICE FOR TRIGGERING A GAS SPRING

CROSS-REFERENCE TO RELATED PATENT APPLICATIONS

This application is a U.S. National Phase Application under 35 U.S.C. § 371 of International Patent Application No. PCT/DE2014/000351, filed Jul. 11, 2014, and claims the benefit of German Patent Application No. 20 2013 006 581.8, filed on Jul. 23, 2013, all of which are incorporated by reference in their entirety herein. The International Application was published in German on Jan. 29, 2015 as International Publication No. WO/2015/010673 under PCT Article 21(2).

FIELD OF THE INVENTION

The present invention relates to a device for triggering a gas spring comprising an actuating device, an actuating element, which is operatively connected to the actuating device and acts on an end-side trigger of the gas spring, the actuating element acting directly or indirectly on the trigger and being formed in particular as a lever arrangement, which reduces or increases the transmitted force and/or displacement, comprises an actuating lever and is in operative connection with the actuating device, and at least one trigger lever, which interacts directly or indirectly with the actuating lever and acts on the trigger, and a housing.

BACKGROUND OF THE INVENTION

Gas springs are known from practice in a wide variety of embodiments. Many gas springs comprise an integrated valve system, whereby the gas spring can be fixed or locked infinitely variably in any position. In this case, the piston is sealed off at a pressure tube and separates two gas chambers from one another. When the valve is closed, the gas spring is arrested and allows locking in the desired position. By actuation of the trigger, usually embodied as a trigger tappet, the valve is opened and the gas spring can thus be positioned infinitely variably. The extending speed and damping can in this case be varied appropriately by choice of the nozzle in the piston.

Gas springs of the type in question here are used in a wide variety of ways. The use of such gas springs in office chairs is known from practice. Similarly, car seats or aircraft seats can be adjusted or parts of sunbeds can be moved by gas springs. Office desks can also be adjusted in height by gas springs.

The gas springs known from practice require an actuating element, which is operatively connected to an actuating device and acts directly on the trigger provided on the end side of the gas spring. In the case of office chairs, for example, this involves using actuating elements that take the form of simple levers which generally press directly on the trigger with an end-side region. Such a configuration of the actuating element has the great disadvantage that considerable forces are still required for triggering the gas spring. In addition to this there is the further disadvantage that it is only with difficulty that the triggering can be performed in stages, so that it is virtually impossible to regulate the speed of the gas spring under considerable triggering forces.

EP 0 907 842 B1 discloses a device for triggering a gas spring of the type mentioned at the beginning. Apart from the trigger lever, the actuating element of the known device also comprises two further levers, which are pivotably coupled to the trigger lever.

Furthermore, DE 197 16 720 A1 and EP 1 328 738 B1 disclose further devices for triggering a gas spring in which a lever mechanism is likewise used. In the case of the device known from DE 197 16 720 A1, there are two levers, which interact by way of a contact region. The operative connection between the levers is realized either by way of a toothing or by way of frictional surfaces lying against one another. The device according to EP 1 328 738 B1 is formed in such a way that the contact region and/or the actuating lever of the lever mechanism has a freely rotatable roller or ball for rolling on the actuating region and/or the contact region.

SUMMARY OF THE INVENTION

Proceeding from the cited prior art, the present invention is based on the object or addresses the technical problem of configuring and developing a device for triggering a gas spring of the type mentioned at the beginning that can be used under a wide variety of geometrical space conditions of the surrounding components, can be produced cost-effectively, ensures a permanently reliable function, is formed in a space-saving manner and can be adapted variably to the respective requirements.

The device according to the invention for triggering a gas spring is accordingly distinguished by the fact that on the housing there is a first housing connecting unit for connecting a connecting unit of the actuating device, the connectable or connected actuating device being guided substantially parallel to the longitudinal direction of the gas spring within the housing, and on the housing there is a second housing connecting unit for connecting a connecting unit of the actuating device, the connectable or connected actuating device being guided substantially transversely to the longitudinal direction of the gas spring within the housing.

The fact that the device according to the invention has alternatively two connecting possibilities for the actuating device means that the device can be respectively adapted and used in the individual case even for a wide variety of required existing geometries of the components surrounding it.

A particularly preferred configuration is distinguished by the fact that the housing has two opposite walls, a lower end wall and in particular an upper end wall, and the first housing connecting unit is on the lower end wall and is in particular formed by a clearance that passes through the lower end wall and in particular has an internal thread, and the second housing connecting unit is arranged in the left-hand or right-hand peripheral region of the opposite walls.

This simple configuration provides a particularly reliable connecting possibility for the actuating device that has a small space requirement and ensures a reliable connection.

According to a preferred configuration, the device is distinguished by the fact that the second housing connecting unit is formed by an abutment element, which is mounted, in particular releasably mounted, on the opposite walls and has a through-clearance.

The mounting of the abutment element may be implemented for example by insertion into one or two opposite slots in the wall of the housing up to a stop. This provides a configuration that can be released without any problem, that is to say can be quickly modified in the case of use. It is also possible to connect the abutment element releasably in some other way, for example by a screw connection. The abutment element may also be fixedly integrated in the housing.

A particularly preferred configuration is distinguished by the fact that the first and/or second housing connecting unit is formed in such a way that an adjusting screw unit or an insertion sleeve unit of the actuating device can be connected or is connected. The use of an adjusting screw unit or insertion sleeve unit makes unproblematic adjustment of the actuating device with respect to the actuating displacement to be set possible without any problem.

A particularly advantageous development that ensures a permanently reliable function is distinguished by the fact that the lever mechanism is arranged completely within the housing. The fact that all of the levers of the lever mechanism are within housing means that there are no disturbing, outwardly protruding components and the components themselves are protected to the greatest extent from soiling or colliding with surrounding components.

To facilitate the assembly or the connection of the actuating device, which with preference is formed as a Bowden cable, a particularly advantageous configuration is distinguished by the fact that on the first housing connecting unit there is an outwardly open lateral slit, through which for example the operating cable of a Bowden cable can be fed without any problem from the outside to the lever mechanism when the Bowden cable is being connected to the lever mechanism, and can subsequently be connected.

In an advantageous configuration, the housing has on the upper side a mounting opening, which during the mounting of the lever mechanism allows access from the outside to this lever mechanism to be possible, in order that it can be appropriately positioned in an easy way.

A first alternative configuration of the actuating element with its lever mechanism is distinguished by the fact that the trigger lever is at one end articulated on the housing pivotably about a fixed pivot axis and at its other end is pivotably connected to a second lever—the connecting lever—at the end thereof, that the connecting lever is pivotably connected at its other end to a third lever—the actuating lever—and that the actuating lever is at one end articulated on the housing pivotably about a fixed pivot axis and at its other end can be operatively connected or is operatively connected to the actuating device, it being possible for the connecting lever to be alternatively formed for example as a punched part or as a bent wire part or clip.

A second alternative of the configuration of the actuating element with its lever mechanism is distinguished by the fact that the trigger lever is at one end mounted pivotably about a fixed pivot axis, this trigger lever having at its other end a contact region for interacting with a second lever—the actuating lever—, the actuating lever being mounted at one end pivotably about a fixed pivot axis and operatively connected at its other end to the actuating device and the actuating lever having a corresponding counter contact region.

The contact region of the trigger lever and/or the counter contact region of the actuating lever may for example have a freely rotatable roller or ball for the rolling of the opposing contact regions, or vice versa. It is also possible that the contact regions lie directly against one another, without there being a ball or roller for rolling.

A particularly advantageous configuration that allows a compact, space-saving solution is distinguished by the fact that the trigger lever has a cranked or angled peripheral contour.

In order to be able with one and the same housing to implement a number of reducing or increasing transmission ratios of the lever mechanism in an easy way according to the desired use, a particularly advantageous configuration is distinguished by the fact that the housing has in its walls a number of pivot bearing clearances and/or the levers of the lever arrangement have a number of clearances in such a way that lever arrangements with different reducing or increasing transmissions can be positioned within the housing in an easy way, in that corresponding pins or bolts are inserted into the clearances as pivot axes.

A particularly preferred configuration that ensures a compact implementation with at the same time a permanently reliable function is distinguished by the fact that the housing has, in particular in its lower end wall, a gas spring connecting unit, by way of which the gas spring can be connected to the trigger led through into the interior of the housing. In the case of this variant of an embodiment, a permanently reliable connection of the gas spring is possible without any problem even under confined space conditions.

The through-clearance preferably has an internal thread, into which there can be screwed for example an external thread of the gas spring for connecting purposes and this external thread of the gas spring is subsequently used for screwing on a lock nut, which additionally secures the connection of the gas spring to the housing.

An alternative variant for connecting the gas spring to the housing is distinguished by the fact that in the region of the gas spring connecting unit there is transversely to the longitudinal direction of the gas spring at least one transverse connecting clearance, into which there is screwed a threaded pin for securing the connection of the part of the gas spring that is inserted into the gas spring connecting unit.

An alternative advantageous configuration of the gas spring connection is distinguished by the fact that the part of the gas spring that is inserted into the gas spring connecting unit has a slot clearance, into which there engages in a form-fitting manner the tip of a screwed-in threaded pin for the connection. Here it is possible to dispense with screwing in of the gas spring.

A possible third particularly advantageous configuration that can be structurally implemented particularly easily is distinguished by the fact that the part of the gas spring that is inserted into the gas spring connecting unit is connected by means of at least one cylindrical pin extending in a clearance of the inserted gas spring part and of the housing or by way of at least one U-shaped clip arranged in a form-fitting manner in a slot in the inserted part of the gas spring.

With preference, the wall of the housing is provided on one or two sides of the outside in the region of the gas spring connecting unit with a cross-sectional reinforcement, so that on the one hand a permanently reliable load-bearing connection can be ensured and otherwise the wall of the housing can be kept relatively thin, so that there is altogether a reduction in weight and space and the device can be used without any problem even under confined space conditions.

The lever mechanisms described represent preferred configurations, which serve the purpose that the gas spring can be triggered in a controlled and defined manner by means of low triggering forces, while at the same time a compact construction can be implemented. Alternatively, the lever mechanism may also comprise eccentric cam plates or cams or a gear wheel or even a gear mechanism. The actuating device itself, which is formed in a particularly easy way as a Bowden cable, may however also be configured in some other way. Thus, for example, electrical servomotors or stepping motors may be used or the actuation may be controlled by inductive or magnetic forces. Hydraulic or pneumatic operation of the actuating elements is also possible without any problem.

The particularly simple configuration of the actuating device as an operating cable or a Bowden cable provides easy mounting and is possible without any problem even under complicated space conditions in the area of use of the device. In this case, the Bowden cable may be articulated by an inner-side actuating lever, which when pulled pivots the actuating lever in the direction of the trigger, it being possible for the end region of the cable alternatively to be guided according to the invention in two directions, that is parallel or transversely to the gas spring, and securely connected to the housing at the first or second connecting unit. For easy triggering, the actuating device itself may have a lever, button or the like. This allows simple constructions that can be produced cost-effectively and ensure a permanently reliable function.

Further embodiments and advantages of the invention are provided by the features that are further presented in the claims and by the exemplary embodiments specified below. The features of the claims may be combined with one another in any desired way as long as they are not clearly mutually exclusive.

BRIEF DESCRIPTION OF THE DRAWING

The invention and advantageous embodiments and developments of the same are described and explained in more detail below on the basis of the examples represented in the drawing. The features that can be taken from the description and the drawing may be applied according to the invention individually on their own or multiply in any desired combination. In the drawing:

FIG. 5 shows a schematic cross section through the device according to FIG. 1 along in the longitudinal direction of the connected gas spring, which is screwed in and screwed by two opposite clamping screws, FIG. 6 shows a schematic cross section through the device according to FIG. 1 along in the longitudinal direction of the connected gas spring, which is not screwed in and is secured by two opposite clamping screws, the tip of which engage in a slot present on the gas spring, FIG. 7 shows a schematic longitudinal section through a second exemplary embodiment of a device for triggering a gas spring comprising a second lever mechanism, the actuating device for the lever mechanism being connected to the housing of the device by way of an adjusting screw and the gas spring being connected directly to the housing, with an upper-side connection, the gas spring and the actuating device being connected substantially in the transverse direction in relation to one another, FIG. 8 shows a schematic longitudinal section through a second exemplary embodiment of a device for triggering a gas spring comprising a second lever mechanism, the actuating device for the lever mechanism being connected to the housing of the device by way of an insertion sleeve and the gas spring being connected directly to the housing, with an upper-side connection, the gas spring and the actuating device being connected substantially in the transverse direction in relation to one another, FIG. 9 shows a schematic cross section through the device according to FIG. 7 along in the longitudinal direction of the connected gas spring, which is screwed in and secured by a lock nut, FIG. 10 shows a schematic cross section through the device according to FIG. 8 along in the longitudinal direction of the connected gas spring, which is screwed in and screwed by two opposite clamping screws, FIG. 11 shows a schematic cross section through the device according to FIG. 1 along in the longitudinal direction of the connected gas spring, which is not screwed in and is secured by two opposite clamping screws, the tip of which engage in a slot present on the gas spring, FIG. 12 shows a schematic side view of the device according to FIGS. 1, 2, 7 and 8, FIG. 13 shows a schematic bottom view of the housing according to FIG. 12, FIG. 14 shows a schematic plan view of the housing according to FIG. 12, FIG. 15 shows a schematic side view from the left of the housing from FIG. 12, FIG. 16 shows a schematic side view from the right of the housing from FIG. 12, FIG. 17 shows a schematic longitudinal section through the housing according to FIG. 17, FIG. 18 shows a schematic side view of the housing of the device according to FIG. 3 without an upper Bowden connection, FIG. 19a shows a schematic side view of an abutment element, which can be inserted into the slots in the housing according to FIG. 17, FIG. 19b shows a schematic end view of the abutment element according to FIG. 19a and FIG. 20 shows a highly schematized representation of a device for triggering a gas spring comprising actuating devices that can be alternatively connected in two different directions and a direct gas spring connection to the housing.

DETAILED DESCRIPTION OF THE INVENTION

Figure 20:
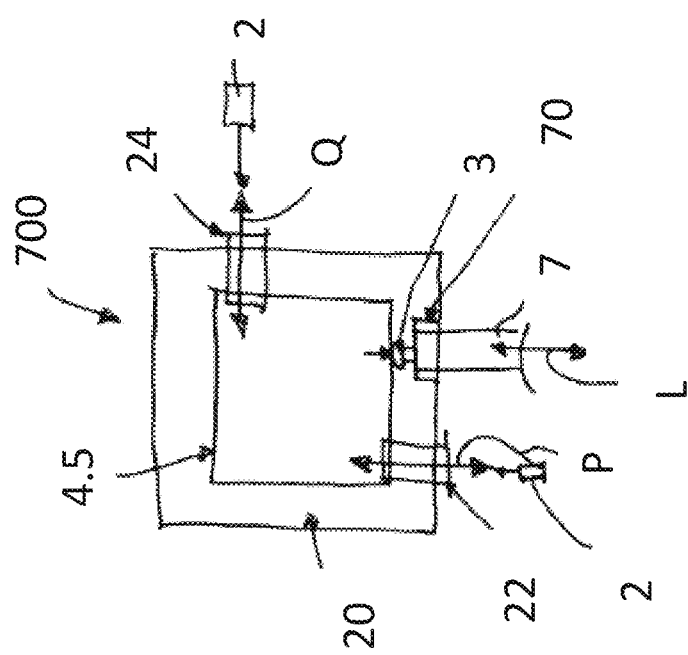

Represented in FIG. 20 in a highly schematized representation is a device 100 for triggering a gas spring 1, which is only partially represented at the upper end in FIG. 20, a concept that is essential to the invention being that an actuating device 2 can be connected by way of a first housing connecting unit 22 in a direction P that is substantially parallel to the longitudinal direction L of the gas spring 1, or alternatively a connection of the actuating device 2 is possible by way of a second housing connecting unit 24, which extends substantially transversely Q to the longitudinal direction L of the gas spring 1. The actuating device 1 in this case acts on an actuating element 4, which is arranged within a housing 20 and comprises a lever mechanism 5, the lever mechanism acting on the trigger 3 of the gas spring 1. Both variants of a connection are possible with the same housing 20.

In addition, it is also possible as a further essential feature that the gas spring 1 or its upper end region with the trigger 3 can be connected directly to the housing 20 of the device 100, it also being possible in certain variants of an embodiment to dispense with the use of a lock nut.

Various embodiments of this inventive idea are presented below in a structural configuration.

FIGS. 1 to 11 show first embodiments of a device 100.1, 100.2, 100.3 for triggering a gas spring 1, which here is only represented as a detail of the end, the devices 100.1, 100.2, 100.3 having a merely indicated actuating device 2, the actuating device 2 being formed in the exemplary embodiment as a Bowden cable with a cable 16. The actuating device 2 acts on an actuating element 4.1 or 4.2, which acts directly on an end-side trigger 3 of the gas spring 1.

Figure 1:
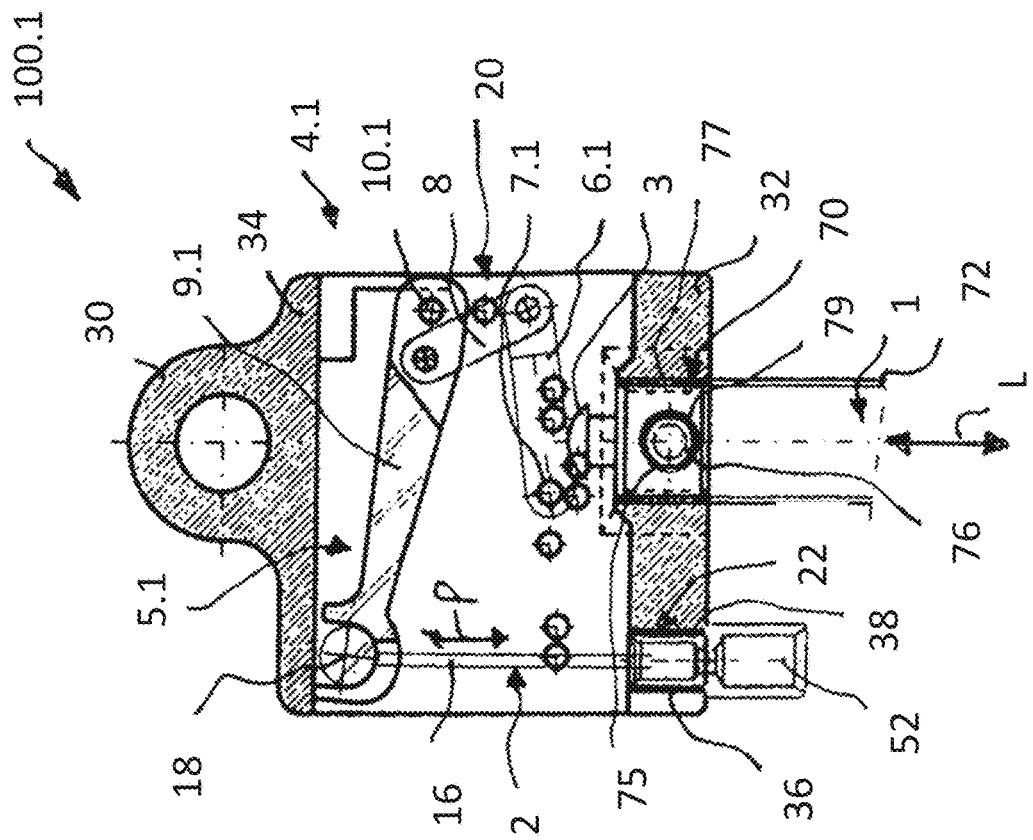
FIG. 1 shows a schematic longitudinal section through a first exemplary embodiment of a device for triggering a gas spring comprising a first lever mechanism, the actuating device for the lever mechanism being connected to the housing of the device by way of an insertion sleeve and the gas spring being connected directly to the housing, with an upper-side connection, the gas spring and the actuating device being connected substantially in the parallel direction.

In FIG. 1, the actuating element 4.1 is embodied as a lever mechanism 5.1, which reduces or increases the transmitted force and/or displacement, one of the levers, the so-called trigger lever 6.1, pressing directly on the trigger 3.

The trigger lever 6.1 is at one end articulated on a housing 20 pivotably about a fixed pivot axis 7.1 and at its other end is pivotably connected to a second lever, the so-called connecting lever 8, at the end thereof. The connecting lever 8 is pivotably connected at its other end to a third lever, the so-called actuating lever 9.1. The actuating lever 9.1 is at one end articulated on the housing 20 pivotably about a fixed pivot axis 10.1 and at the other end is operatively connected to the actuating device 2 by way of a pressing nipple 18.

The ratio of the lever portions on the one hand of the trigger lever 6.1, between the fixed pivot axis 7.1 and the trigger 3 and also between the trigger 3 and the pivoted connection to the connecting lever 8, and on the other hand of the actuating lever 9.1, between the fixed pivot axis 10.1 and the free end or the operative connection to the actuating device 2, and also between the pivoted connection to the connecting lever 8 and said free end or operative connection to the actuating device 2, dictates the degree of reducing or increasing transmission of the lever mechanism 5.1.

Figure 4:
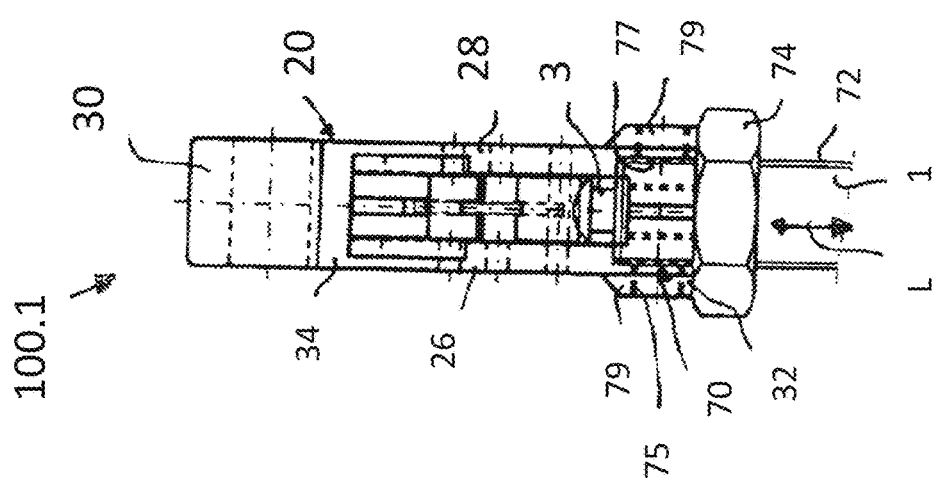
FIG. 4 shows a schematic cross section through the device according to FIG. 2 along in the longitudinal direction of the connected gas spring, which is screwed in and secured by a lock nut.

The entire lever mechanism is surrounded by the housing 20, which consists of two opposite parallel walls 26, 28, a lower end wall 32 and an upper end wall 34 (see FIGS. 4, 5 and 6 in particular). On the upper side, integrally formed on the upper end wall 34 is a connecting unit 30, which is formed as a Bowden connection and serves for connecting the device 100.1 to surrounding components.

The device has in the lower end wall 32, in the peripheral region on the left in FIG. 1, a first housing connecting unit 22, which is formed as a through-clearance 36 with an internal thread 38.

Adjoining the through-clearance 36 there is a through-slit 54, which is open to the left in FIG. 1, on the lower end wall 32. The first housing connecting unit 22 serves the purpose of connecting the incoming actuating device 2 to the housing 20. This is structurally implemented in the case of the exemplary embodiment according to FIG. 1 by an insertion sleeve unit 52. The insertion sleeve unit 52 is arranged in the clearance 36 of the first housing connecting unit 22 and the cable 16 of the actuating device 2 is led through into the interior up to the connection of the pressing nipple 18 to the one end region of the actuating lever 9. The slit 36 serves the purpose that the actuating device 2, in particular the cable 16, can be laterally inserted in an easy way during mounting.

Figure 2:
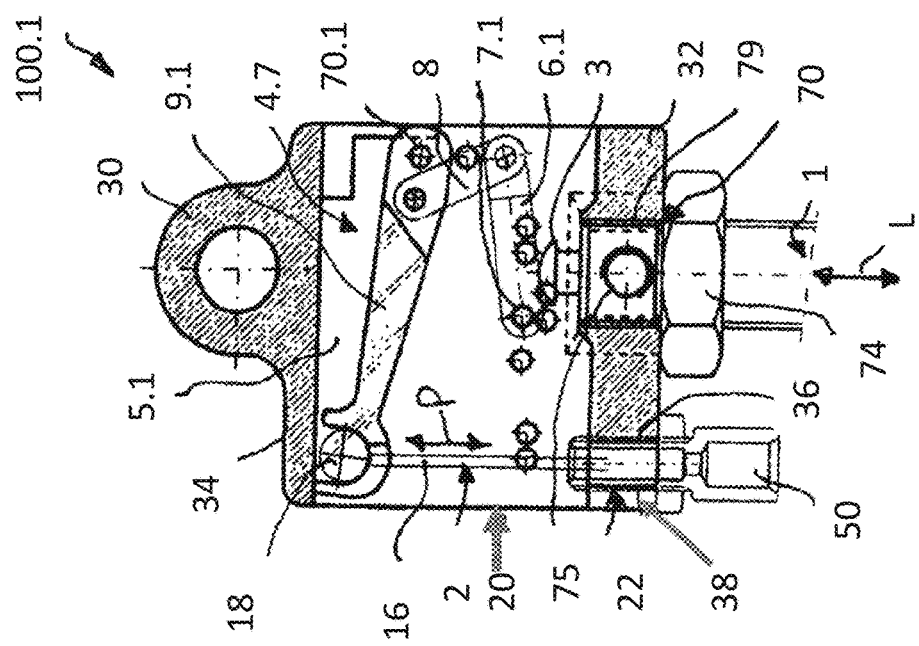
FIG. 2 shows a schematic longitudinal section through a first exemplary embodiment of a device for triggering a gas spring comprising a first lever mechanism, the actuating device for the lever mechanism being connected to the housing of the device by way of an adjusting screw and the gas spring being connected directly to the housing, with an upper-side connection, the gas spring and the actuating device being connected substantially in the parallel direction.

The device 100.1 represented in FIG. 2 differs from the device 100.1 according to FIG. 1 in that, instead of the insertion sleeve unit 52, in the first housing connecting unit 22 an adjusting screw unit 50 is screwed in. With this adjusting screw unit 50, the effective length of the cable 16 of the actuating device 2 can be adjusted. The same components bear the same designations and are not explained again.

The device 100.1 of FIG. 1 and of FIG. 2 is also distinguished by the fact that the upper end region of the gas spring 1, in which the trigger 3 is guided longitudinally displaceably, is connected directly to the housing 20. For this purpose, the device 100.1 has in the lower end wall 32 a gas spring connecting unit 70, which in the exemplary embodiment is formed as a through-clearance with an internal thread 72. The end region of the gas spring 1 has an external thread 72, which can be screwed into the internal thread 71 of the gas spring connecting unit 70. The longitudinal direction of the gas spring is denoted in FIGS. 1 and 2 by L. In the case of the embodiment of the device 100.1 according to FIG. 1, the screwed-in end region of the gas spring 1 is secured from both outer sides by a threaded pin screwed into a second clearance transversely to the longitudinal direction, that is to say perpendicularly to the plane of the page of FIG. 1.

In the region of the gas spring connecting unit 70, the walls 26, 28 of the housing 20 have a cross-sectional reinforcement 79. The threaded pin is respectively screwed into a transverse connecting clearance 75 passing through the wall 26 or 28. As a result, the gas spring 1 is securely connected to the housing 20.

The connecting direction of the actuating device 2 in the case of the exemplary embodiments according to FIGS. 1 and 2 is indicated in the figures by the double-headed arrow P and extends parallel to the longitudinal direction L of the gas spring 1.

The embodiment of the device 100.1 according to FIG. 2 differs from the embodiment according to FIG. 1 in that the embodiment according to FIG. 2 dispenses with the laterally screwed-in threaded pins and the positional securement of the gas spring 1 on the housing is brought about by a lock nut 74 screwed onto the external thread 72.

The connection of the gas spring 1 in the case of the embodiment according to FIG. 1 is represented in more detail in cross section in FIG. 5. The connection of the gas spring according to the embodiment in FIG. 2 is represented in more detail in cross section in FIG. 4.

Finally, a third variant of an embodiment of the connection of the gas spring 1 to the housing is also possible, represented in cross section in FIG. 6. It resembles the embodiment according to FIG. 5, but no internal thread of the transverse connecting clearance 75 is required here, since the end region of the gas spring 1 has a peacock-shaped slot, into which the threaded pins screwed into the transverse clearance 75 engage with their tip in a form-fitting manner in the screwed-in state, so that the reliable connection of the gas spring 1 to the housing 20 is ensured.

Figure 3:
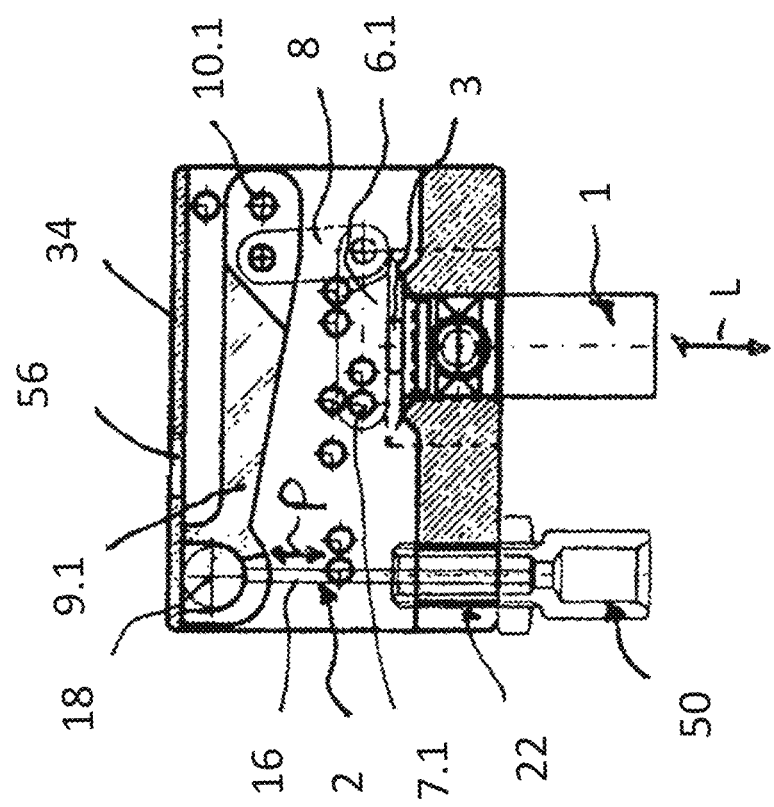
FIG. 3 shows a schematic longitudinal section through a first exemplary embodiment of a device for triggering a gas spring comprising a first lever mechanism, the actuating device for the lever mechanism being connected to the housing of the device by way of an adjusting screw and the gas spring being connected directly to the housing, without an upper-side connection and with an upper-side mounting clearance, the gas spring and the actuating device being connected substantially in the parallel direction.

The device 100.3 represented in FIG. 3 for triggering a gas spring 1 resembles the devices 100 presented above in respect of the actuating element 4.1 with the lever mechanism 5.1, but is of a more compact form and is without an upper connecting unit 30. Formed in the upper end wall 34 is a mounting opening 36, through which access to the lever mechanism 5.1 or actuating lever 9.1 is possible to facilitate mounting. As in the case of the embodiment according to FIG. 2, the connection of the actuating device 2 to the housing 20 takes place by way of the first housing connecting unit 22 with the screwed-in adjusting screw unit 50. The same components bear the same designations and are not explained again. The connection of the upper end region of the gas spring 1 to the housing 20 takes place in accordance with the representation in FIG. 6 with threaded pins 76, the tip 78 of which engage in a slot 77 in the upper end region of the gas spring 1.

In FIGS. 7 and 8, an alternative device 100.2 for triggering a gas spring 1 is respectively represented, having fundamentally the same structure in respect of the housing 20 as the device 100.1 described above, but here the actuating device 2 being connected in the right-hand upper peripheral region of the housing by way of a second housing connecting unit 24, so that the cable 16 of the actuating device 2 connected as a Bowden cable extends substantially transversely Q to the longitudinal direction L of the gas spring 1.

The actuating element 4.2 with its lever mechanism 5.2, accommodated completely in the interior of the housing 20, differs from the lever mechanism 5.1 in that there is a trigger lever 6.2, which is fixedly pivotable about a pivot axis 7.2, acts on the trigger 3 and has at its other end region a rotatable roller 62, which forms a contact area 12, which lies against a corresponding contact area 64 (counter contact area 14) of an actuating lever 9.2, the actuating lever 9.2 at its one end being mounted pivotably about a fixed pivot axis 10.2 and at its other end having the cable 16 of the actuating device anchored in front of the pressing nipple 18. When the actuating lever 9.2 is actuated, its contact area 64 acts on the roller 62 of the trigger lever 6.2, the latter rolling on the contact area 64 and corresponding thereto exerting the trigger pressure on the trigger 3 of the gas spring 1. The trigger lever 6.2 is in this case of a cranked form, so that a compact structure can be achieved.

The second housing connecting unit 24 has an abutment element 40, which in the right-hand upper peripheral region of the housing 20 is mounted releasably in a form-fitting manner on the opposite walls 26, 28. The abutment element 40 has a through-clearance 42 with an internal thread 43 and is represented in more detail in FIGS. 19a and b.

In the case of the embodiment according to FIG. 8, an insertion sleeve unit 52 is inserted into the clearance 42 and in the embodiment according to FIG. 7 an adjusting screw unit 50 is inserted or screwed into the clearance 42, for the guiding connection of the actuating device.

In the exemplary embodiment, the abutment element 40 has on both sides on the upper side a projection unit 45, which is inserted into a corresponding inwardly open slot 44 in the housing 20 on the inner wall of the walls 26, 28. Toward the outside, the abutment element 40 has an abutment plate 46, which has the through-clearance 42 and can be brought to bear against the inner side of the walls 26, 28 by way of corresponding clearances 48, so that with the abutment element 40 inserted, the projection unit 45 is mounted in the slot 44 and the abutment plate 46 is mounted in the clearances 48, and consequently on the outside finishes flush with the housing 20.

The housing itself is represented in more detail in FIGS. 12 to 18.

In FIGS. 12 and 17, the different geometrical arrangements of the fixed pivot axes 7.1, 7.2, 10.1, 10.2 are represented on the housing 20, the alternative arrangement of the pivot axes being indicated by a dashed line. Depending on at which pivot axes 7, the lever elements of the lever mechanism 5 are connected, different reducing and increasing transmission ratios of the lever mechanism can be implemented.

The invention claimed is:

1. A device for triggering a gas spring comprising:
an actuating device comprising at least one connecting unit;
an actuating element configured to actuate an end-side trigger of the gas spring and further comprising:
an actuating lever in operative connection with the actuating device and
at least one trigger lever configured to interact with the actuating lever and actuate the trigger; and
a housing having:
a first housing connecting unit disposed within the housing that connects the connecting unit of the actuating device, and configured to guide the actuating device substantially parallel to a longitudinal direction of the gas spring within the housing, and
a second housing connecting unit disposed within the housing that connects the connecting unit of the actuating device, and configured to guide the actuating device substantially transversely to the longitudinal direction of the gas spring within the housing,
wherein the housing further has two opposing walls, a lower end wall and an upper end wall, the first housing connecting unit disposed on the lower end wall and is formed by a passage that passes through the lower end wall, the passage equipped with an internal thread, and the second housing connecting unit is arranged in the left-hand or right-hand peripheral region of the opposite walls, wherein the second housing connecting unit is formed by an abutment element, which is releasably disposed on one of the opposing walls and has a passage there through.

2. The device as claimed in claim 1, wherein
the abutment element is mounted in at least one slot in one of the opposing walls.

3. The device as claimed in claim 2, wherein
the abutment element is mounted on a pair of inwardly open slots lying on the opposing walls.

4. The device as claimed in claim 1, wherein
at least one of the first and second housing connecting unit is formed in such a manner that an adjusting screw unit or an insertion sleeve unit of the actuating device can be connected to the at least one of the first housing connecting unit and the second housing connecting unit.

5. The device as claimed in claim 1, wherein
the lever mechanism is arranged completely within the housing.

6. The device as claimed in claim 1, wherein
the first housing connecting unit is adjoined by an outwardly open lateral slit.

7. The device as claimed in claim 1, wherein
the housing has on the upper end wall a mounting opening for access to the lever mechanism.

8. The device as claimed in claim 1, wherein
the trigger lever of the actuating element is articulated on the housing pivotably about a fixed pivot axis at one end and is pivotably connected to a connecting lever at another end,
the connecting lever is pivotably connected to an actuating lever at its other end, said actuating lever being articulated on the housing pivotably about a fixed pivot axis at one end and being able to be operatively connected to the actuating device at another end.

9. The device as claimed in claim 8, wherein
the connecting lever is formed as one of a punched part, a bent wire part and clip.

10. The device as claimed in claim 8, wherein
the trigger lever has at least one of a cranked and angled peripheral contour.

11. The device as claimed in claim 1, wherein
the trigger lever of the actuating element is mounted pivotably about a fixed pivot axis at one end, and has a contact region for interacting with an actuating lever at another end, and
the actuating lever is mounted pivotably about a fixed pivot axis at one end and operatively connected to the actuating device and the actuating lever having a corresponding counter contact region at another end.

12. The device as claimed in claim 11, wherein
at least one of the contact region and the counter contact region has a at least one of a freely rotatable roller and ball for the rolling on the counter contact region.

13. The device as claimed in claim 11, wherein
the trigger lever has one of a cranked angled peripheral contour.

14. The device as claimed in claim 1, wherein
the housing has in its walls a number of pivot bearing openings to permit the introduction of at least one of a pivot axis and at least one triggering lever of the lever arrangement, wherein the actuating or at least one triggering levers of the lever arrangement have a number of openings configured to permit positioning within the housing.

15. The device as claimed in claim 1, wherein
the housing has in the lower end wall, a gas spring connecting unit, configured to connect the gas spring to the trigger inserted through into the interior of the housing.

16. The device as claimed in claim 15, wherein
the gas spring connecting unit is formed as an opening in the housing configured with an internal thread.

17. The device as claimed in claim 16, wherein
the gas spring has an external thread, which is screwed into the internal thread of the gas spring connecting unit and is secured by a lock nut.

18. The device as claimed in claim 15, wherein
at least one transverse connecting opening is positioned transversely to the longitudinal direction of the gas spring and proximal to the gas spring connecting unit, into which a threaded pin is screwed so as to secure the connection of a part of the gas spring that is inserted into the gas spring connecting unit.

19. The device as claimed in claim 18, wherein
the part of the gas spring that is inserted into the gas spring connecting unit has a slot clearance, into which there engages the tip of a screwed-in threaded pin for the connection.

20. The device as claimed in claim 15, wherein
the part of the gas spring inserted into the gas spring connecting unit is connected by means of at least one of a cylindrical pin extending through an opening of the inserted gas spring part and housing at least one U-shaped clip arranged in a form-fitting manner in a slot in the inserted part of the gas spring.

21. The device as claimed in claim 15, wherein
the wall of the housing has one or more cross-sectional reinforcements disposed on one or two sides of the outside in the region of the gas spring connecting unit.

* * * * *